(12) United States Patent
Webster et al.

(10) Patent No.: US 12,286,045 B2
(45) Date of Patent: *Apr. 29, 2025

(54) VEHICLE SEATING SYSTEM AND METHOD FOR PRODUCING SAME

(71) Applicant: Lear Corporation, Southfield, MI (US)

(72) Inventors: William Webster, Millington, MI (US); David Abdella, Royal Oak, MI (US); Joshua Hallock, Warren, MI (US); Samuel Blair, Troy, MI (US); Patrick J. Carlsen, Grosse Pointe Woods, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,713

(22) Filed: Jun. 8, 2023

(65) Prior Publication Data

US 2023/0331129 A1 Oct. 19, 2023

Related U.S. Application Data

(63) Continuation of application No. 17/540,547, filed on Dec. 2, 2021, now Pat. No. 11,807,143.

(51) Int. Cl.
  *B60N 2/56* (2006.01)
  *B29D 99/00* (2010.01)
  (Continued)

(52) U.S. Cl.
  CPC ......... *B60N 2/7035* (2013.01); *B60N 2/5825* (2013.01); *B60N 2/5883* (2013.01); *B60N 2/7017* (2013.01)

(58) Field of Classification Search
  CPC ... B60N 2/7035; B60N 2/5825; B60N 2/5883
  See application file for complete search history.

(56) References Cited

U.S. PATENT DOCUMENTS

| 1,621,008 A | 3/1927 | Fricker |
| 2,130,935 A | 9/1938 | Thompson |

(Continued)

FOREIGN PATENT DOCUMENTS

| AU | 2006227668 A | 9/2006 |
| AU | 2006227668 A1 | 9/2006 |

(Continued)

OTHER PUBLICATIONS

International Search Report and Written Opinion for Application No. PCT/US2022/051316, dated Apr. 3, 2023, 13 Pages.

(Continued)

*Primary Examiner* — Shin H Kim
(74) *Attorney, Agent, or Firm* — Brooks Kushman, P.C.

(57) ABSTRACT

A vehicle seating system and a method for producing a vehicle seating system may include a cushion made at least in part from a stranded-mesh material and configured to support a seated occupant. Also included may be a support structure configured to support the cushion and a trim-cover material configured to be disposed over at least a portion of the stranded-mesh material. The stranded-mesh material may include an integrated attachment arrangement configured to receive a fastening arrangement for securing the trim-cover material to the stranded-mesh material.

20 Claims, 3 Drawing Sheets

(51) Int. Cl.
  *B60N 2/58* (2006.01)
  *B60N 2/64* (2006.01)
  *B60N 2/70* (2006.01)

(56) References Cited

U.S. PATENT DOCUMENTS

| | | | |
|---|---|---|---|
| 2,188,995 A | 2/1940 | Avery et al. |
| 2,630,938 A | 3/1953 | Burnett |
| 2,630,968 A | 3/1953 | Morris |
| 3,155,363 A | 11/1964 | Lohr |
| 3,309,052 A | 3/1967 | Borisof |
| 3,315,283 A | 4/1967 | Larsen |
| 3,630,572 A | 12/1971 | Homier |
| 3,689,620 A | 9/1972 | Miyazaki et al. |
| 3,733,658 A | 5/1973 | Mitchell |
| D239,147 S | 3/1976 | Karlsen |
| 3,961,823 A | 6/1976 | Caudill, Jr. |
| 4,031,579 A | 6/1977 | Larned |
| 4,287,657 A | 9/1981 | Andre et al. |
| 4,396,823 A | 8/1983 | Nihei et al. |
| 4,476,594 A | 10/1984 | McLeod |
| 4,563,387 A | 1/1986 | Takagi et al. |
| 4,663,211 A | 5/1987 | Kon |
| 4,751,029 A | 6/1988 | Swanson |
| 4,859,516 A | 8/1989 | Yamanaka et al. |
| 4,860,402 A | 8/1989 | Dichtel |
| 4,876,135 A | 10/1989 | McIntosh |
| 4,881,997 A | 11/1989 | Hatch |
| 4,900,377 A | 2/1990 | Redford et al. |
| 4,913,757 A | 4/1990 | Yamanaka et al. |
| 4,933,224 A | 6/1990 | Hatch |
| 4,952,265 A | 8/1990 | Yamanaka et al. |
| 4,953,770 A | 9/1990 | Bond, Sr. |
| 5,003,664 A | 4/1991 | Wong |
| 5,007,676 A | 4/1991 | Lien |
| 5,016,941 A | 5/1991 | Yokota |
| 5,092,381 A | 3/1992 | Feijin et al. |
| 5,095,592 A | 3/1992 | Doerfling |
| 5,313,034 A | 5/1994 | Grimm et al. |
| 5,378,296 A | 1/1995 | Vesa |
| 5,381,922 A | 1/1995 | Gladman et al. |
| 5,405,178 A | 4/1995 | Weingartner et al. |
| D364,269 S | 11/1995 | Sabosky |
| 5,464,491 A | 11/1995 | Yamanaka |
| 5,482,665 A | 1/1996 | Gill |
| 5,492,662 A | 2/1996 | Kargol et al. |
| 5,494,627 A | 2/1996 | Kargol et al. |
| 5,536,341 A | 7/1996 | Kelman |
| 5,551,755 A | 9/1996 | Lindberg |
| 5,586,807 A | 12/1996 | Taggart |
| 5,587,121 A | 12/1996 | Vesa |
| 5,620,759 A | 4/1997 | Insley et al. |
| 5,622,262 A | 4/1997 | Sadow |
| 5,639,543 A | 6/1997 | Isoda et al. |
| 5,669,129 A | 9/1997 | Smith et al. |
| 5,669,799 A | 9/1997 | Moseneder et al. |
| 5,679,296 A | 10/1997 | Kelman et al. |
| 5,733,825 A | 3/1998 | Martin et al. |
| 5,788,332 A | 8/1998 | Hettinga |
| 5,811,186 A | 9/1998 | Martin et al. |
| 5,819,408 A | 10/1998 | Catlin |
| 5,833,321 A | 11/1998 | Kim et al. |
| 5,966,783 A | 10/1999 | Genereux et al. |
| 6,057,024 A | 5/2000 | Mleziva et al. |
| 6,063,317 A | 5/2000 | Carroll, III |
| 6,131,220 A | 10/2000 | Morimura |
| 6,272,707 B1 | 8/2001 | Robrecht et al. |
| 6,283,552 B1 | 9/2001 | Halse et al. |
| 6,302,487 B1 | 10/2001 | Fujita et al. |
| 6,347,790 B1 | 2/2002 | Nishibori et al. |
| 6,378,150 B1 | 4/2002 | Minegishi et al. |
| D461,746 S | 8/2002 | Olson et al. |
| 6,457,218 B1 | 10/2002 | Lawrence |
| 6,558,590 B1 | 5/2003 | Stewart |
| 6,668,429 B2 | 12/2003 | Fujisawa et al. |
| 6,766,201 B2 | 7/2004 | Von Arx et al. |
| 6,776,201 B2 | 8/2004 | Willis |
| 6,918,146 B2 | 7/2005 | England |
| D523,330 S | 6/2006 | Mattesky |
| 7,073,230 B2 | 7/2006 | Boville |
| 7,100,978 B2 | 9/2006 | Ekern et al. |
| D530,192 S | 10/2006 | Becerra |
| 7,128,371 B2 | 10/2006 | Kawasaki et al. |
| 7,141,768 B2 | 11/2006 | Malofsky et al. |
| D538,704 S | 3/2007 | Kaminski |
| 7,290,300 B1 | 11/2007 | Khambete |
| 7,377,762 B2 | 5/2008 | Nishibori et al. |
| 7,427,103 B2 | 9/2008 | Weber |
| 7,481,489 B2 | 1/2009 | Demick |
| 7,506,939 B2 | 3/2009 | Brockschneider et al. |
| 7,547,061 B2 | 6/2009 | Horimatsu et al. |
| 7,549,707 B2 | 6/2009 | Brennan et al. |
| 7,622,179 B2 | 11/2009 | Patel |
| 7,625,629 B2 | 12/2009 | Takaoka |
| 7,669,925 B2 | 3/2010 | Beck et al. |
| 7,707,743 B2 | 5/2010 | Schindler et al. |
| 7,771,375 B2 | 8/2010 | Nishibori et al. |
| 7,837,263 B2 | 11/2010 | Booth et al. |
| 7,892,991 B2 | 2/2011 | Yamanaka et al. |
| D636,293 S | 4/2011 | Dolce et al. |
| 7,946,649 B2 | 5/2011 | Galbreath et al. |
| 7,993,734 B2 | 8/2011 | Takaoka |
| 8,052,212 B2 | 11/2011 | Backendorf |
| 8,056,263 B2 | 11/2011 | Schindler et al. |
| 8,226,882 B2 | 7/2012 | Takaoka |
| 8,240,759 B2 | 8/2012 | Hobl et al. |
| 8,276,235 B2 | 10/2012 | Naughton |
| 8,277,210 B2 | 10/2012 | Takaoka |
| D677,193 S | 3/2013 | MacDonald |
| 8,563,121 B2 | 10/2013 | Takaoka |
| 8,563,123 B2 | 10/2013 | Takaoka |
| 8,568,635 B2 | 10/2013 | Takaoka |
| 8,721,825 B2 | 5/2014 | Takaoka |
| 8,752,902 B2 | 6/2014 | Labish |
| 8,757,996 B2 | 6/2014 | Takaoka |
| 8,828,293 B2 | 9/2014 | Takaoka |
| 8,882,202 B2 | 11/2014 | Petzel et al. |
| 8,932,692 B2 | 1/2015 | Pearce |
| 9,004,591 B2 | 4/2015 | Murasaki et al. |
| 9,097,921 B2 | 8/2015 | Ogasawara et al. |
| 9,168,854 B2 | 10/2015 | Ursino et al. |
| 9,169,585 B2 | 10/2015 | Takaoka |
| 9,174,404 B2 | 11/2015 | Takaoka |
| 9,179,748 B2 | 11/2015 | Esti |
| 9,194,066 B2 | 11/2015 | Takaoka |
| 9,283,875 B1 | 3/2016 | Pellettiere |
| 9,334,593 B2 | 5/2016 | Sasaki |
| 9,434,286 B2 | 9/2016 | Klusmeier et al. |
| 9,440,390 B2 | 9/2016 | Takaoka |
| 9,447,522 B2 | 9/2016 | Zikeli et al. |
| 9,456,702 B2 | 10/2016 | Miyata et al. |
| 9,528,209 B2 | 12/2016 | Takaoka |
| 9,561,612 B2 | 2/2017 | Takaoka |
| 9,598,803 B2 | 3/2017 | Takaoka |
| 9,615,670 B2 | 4/2017 | Takaoka |
| 9,616,790 B2 | 4/2017 | Stankiewicz et al. |
| 9,617,021 B2 | 4/2017 | McCorkle et al. |
| 9,669,744 B2 | 6/2017 | Cao et al. |
| 9,688,007 B2 | 6/2017 | Cheng |
| 9,708,067 B2 | 7/2017 | Wilson et al. |
| 9,751,442 B2 | 9/2017 | Smith |
| 9,771,174 B2 | 9/2017 | Murray |
| D798,875 S | 10/2017 | Huang |
| 9,789,796 B1 | 10/2017 | White |
| 9,918,559 B2 | 3/2018 | Osaki |
| 9,918,560 B2 | 3/2018 | Osaki |
| 9,925,899 B2 | 3/2018 | Mogi et al. |
| 9,938,649 B2 | 4/2018 | Taninaka et al. |
| 9,970,140 B2 | 5/2018 | Taninaka et al. |
| 10,118,323 B2 | 11/2018 | Fujita et al. |
| 10,231,511 B2 | 3/2019 | Guyan et al. |
| 10,233,073 B2 | 3/2019 | Takaoka |
| 10,266,977 B2 | 4/2019 | Takaoka |
| 10,316,444 B2 | 6/2019 | Wakui et al. |

(56) References Cited

U.S. PATENT DOCUMENTS

| | | |
|---|---|---|
| 10,328,618 B2 | 6/2019 | Takaoka |
| 10,343,565 B2 | 7/2019 | Baek et al. |
| 10,398,236 B2 | 9/2019 | Achten et al. |
| 10,399,848 B2 | 9/2019 | Kristo et al. |
| 10,414,305 B2 | 9/2019 | Ishii et al. |
| 10,421,414 B2 | 9/2019 | Townley et al. |
| 10,501,598 B2 | 12/2019 | Baldwin et al. |
| 10,604,040 B2 | 3/2020 | Clauser et al. |
| 10,618,799 B2 | 4/2020 | Shah et al. |
| 10,730,419 B2 | 8/2020 | Low et al. |
| 10,736,435 B2 | 8/2020 | Duncan et al. |
| 10,744,914 B2 | 8/2020 | Baek et al. |
| 10,750,820 B2 | 8/2020 | Guyan |
| RE48,225 E | 9/2020 | Kheil et al. |
| 10,780,805 B2 | 9/2020 | Kamata et al. |
| 10,806,272 B2 | 10/2020 | Ando et al. |
| 10,821,862 B2 | 11/2020 | Russman et al. |
| 10,843,600 B2 | 11/2020 | Booth et al. |
| 10,882,444 B2 | 1/2021 | Townley et al. |
| 10,889,071 B2 | 1/2021 | Kojima et al. |
| D909,792 S | 2/2021 | Pound |
| 10,934,644 B2 | 3/2021 | Taninaka et al. |
| 11,007,761 B2 | 5/2021 | Ben-Daat et al. |
| 11,168,421 B2 | 11/2021 | Wakui et al. |
| 11,186,336 B2 | 11/2021 | Primeaux et al. |
| D948,764 S | 4/2022 | Peterson |
| 11,369,532 B2 | 6/2022 | Wilson et al. |
| 11,383,625 B2 | 7/2022 | Voigt et al. |
| 11,554,699 B2 | 1/2023 | Liau et al. |
| D1,005,380 S | 11/2023 | McWilliams et al. |
| 2002/0101109 A1 | 8/2002 | Stiller et al. |
| 2002/0193221 A1 | 12/2002 | Tisi |
| 2003/0026970 A1 | 2/2003 | Hernandez et al. |
| 2003/0032731 A1 | 2/2003 | Oswald et al. |
| 2003/0061663 A1 | 4/2003 | Lampel |
| 2003/0092335 A1 | 5/2003 | Takaoko |
| 2004/0036326 A1 | 2/2004 | Bajic et al. |
| 2004/0099981 A1 | 5/2004 | Gerking |
| 2004/0126577 A1 | 7/2004 | Lee et al. |
| 2004/0142619 A1 | 7/2004 | Ueno et al. |
| 2004/0255385 A1 | 12/2004 | England |
| 2005/0066423 A1 | 3/2005 | Hogan |
| 2005/0198874 A1 | 9/2005 | Wurm |
| 2005/0238842 A1 | 10/2005 | Schindzielorz et al. |
| 2006/0075615 A1 | 4/2006 | Khambete |
| 2006/0116045 A1 | 6/2006 | Nishibori et al. |
| 2006/0198983 A1 | 9/2006 | Patel |
| 2006/0237986 A1 | 10/2006 | Brockschneider et al. |
| 2007/0001336 A1 | 1/2007 | Nishibori et al. |
| 2007/0057414 A1 | 3/2007 | Hartge |
| 2007/0066197 A1 | 3/2007 | Woo et al. |
| 2007/0134464 A1 | 6/2007 | Schindzielorz et al. |
| 2007/0207691 A1 | 9/2007 | Cobbett Wiles et al. |
| 2008/0099458 A1 | 5/2008 | Hilmer |
| 2008/0102149 A1 | 5/2008 | Williams et al. |
| 2008/0203615 A1 | 8/2008 | Brum |
| 2008/0252111 A1 | 10/2008 | Rothkop et al. |
| 2008/0254281 A1 | 10/2008 | Chen et al. |
| 2008/0309143 A1 | 12/2008 | Booth et al. |
| 2009/0008377 A1 | 1/2009 | Nathan et al. |
| 2009/0108494 A1 | 4/2009 | Ito et al. |
| 2009/0152909 A1 | 6/2009 | Andersson |
| 2009/0269570 A1 | 10/2009 | Takaoka |
| 2009/0269571 A1 | 10/2009 | Takaoka |
| 2010/0181796 A1 | 7/2010 | Galbreath et al. |
| 2010/0258334 A1 | 10/2010 | Akaike et al. |
| 2011/0252568 A1 | 10/2011 | Ramp |
| 2011/0278902 A1 | 11/2011 | Galbreath et al. |
| 2011/0316185 A1 | 12/2011 | Takaoka |
| 2012/0042452 A1 | 2/2012 | Takaoka |
| 2012/0104646 A1 | 5/2012 | Takaoka |
| 2012/0112515 A1 | 5/2012 | Labish |
| 2012/0174352 A1 | 7/2012 | Tsunoda |
| 2012/0180939 A1 | 7/2012 | Takaoka |
| 2012/0181841 A1 | 7/2012 | Petzel et al. |
| 2012/0301701 A1 | 11/2012 | Takaoka |
| 2012/0319323 A1 | 12/2012 | Takaoka |
| 2012/0328722 A1 | 12/2012 | Takaoka |
| 2013/0000043 A1 | 1/2013 | Bullard et al. |
| 2013/0020016 A1 | 1/2013 | Takaoka |
| 2013/0137330 A1 | 5/2013 | Grimm |
| 2013/0161858 A1 | 6/2013 | Sasaki |
| 2013/0164123 A1 | 6/2013 | Helmenstein |
| 2013/0189472 A1 | 7/2013 | Takaoka |
| 2013/0200661 A1 | 8/2013 | Klusmeier et al. |
| 2014/0029900 A1 | 1/2014 | Logan, Jr. et al. |
| 2014/0035191 A1 | 2/2014 | Takaoka |
| 2014/0037907 A1 | 2/2014 | Takaoka |
| 2014/0037908 A1 | 2/2014 | Takaoka |
| 2014/0042792 A1 | 2/2014 | Kajiwara |
| 2014/0062161 A1 | 3/2014 | Elenbaas et al. |
| 2014/0138016 A1 | 5/2014 | Takaoka |
| 2014/0167328 A1 | 6/2014 | Petzel |
| 2014/0354029 A1 | 12/2014 | Takaoka |
| 2014/0370769 A1 | 12/2014 | Osaki |
| 2014/0378015 A1 | 12/2014 | Osaki |
| 2015/0072107 A1 | 3/2015 | Fujita et al. |
| 2015/0091209 A1 | 4/2015 | Mueller et al. |
| 2015/0197056 A1 | 7/2015 | Takaoka |
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 | 10/2015 | Noguchi et al. |
| 2015/0274048 A1 | 10/2015 | Mogi et al. |
| 2015/0284894 A1 | 10/2015 | Takaoka |
| 2015/0367583 A1 | 12/2015 | Blot et al. |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0263802 A1 | 9/2016 | Takaoka |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0148312 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0231428 A1 | 7/2020 | Migneco et al. |
| 2020/0262323 A1 | 8/2020 | Robinson et al. |
| 2020/0315365 A1 | 10/2020 | Kondo et al. |
| 2020/0332445 A1 | 10/2020 | Taninaka et al. |
| 2020/0360210 A1 | 11/2020 | Zoni, III et al. |

(56) References Cited

U.S. PATENT DOCUMENTS

| | | |
|---|---|---|
| 2021/0024155 A1 | 1/2021 | Primeaux et al. |
| 2021/0046731 A1 | 2/2021 | Nishikawa et al. |
| 2021/0054549 A1 | 2/2021 | Takaoka |
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0188138 A1 | 6/2021 | Powell et al. |
| 2021/0221266 A1 | 7/2021 | Kozlowski et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |
| 2022/0169554 A1 | 6/2022 | Du Moulinet D'Hardemare et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi et al. |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322136 A1 | 10/2023 | Wang et al. |

FOREIGN PATENT DOCUMENTS

| | | |
|---|---|---|
| AU | 2003296088 B2 | 9/2008 |
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 202509164 U | 10/2012 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 104582538 B | 9/2016 |
| CN | 104080959 B | 2/2017 |
| CN | 106387295 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109680413 A | 4/2019 |
| CN | 107614238 B | 2/2020 |
| CN | 107208339 B | 6/2020 |
| CN | 107532357 B | 8/2020 |
| CN | 106231959 B | 10/2020 |
| CN | 111989430 A | 11/2020 |
| CN | 112020578 A | 12/2020 |
| CN | 107708493 B | 1/2021 |
| CN | 107208340 B | 2/2021 |
| CN | 109552123 B | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| CN | 113930900 B | 1/2023 |
| DE | 2626748 C3 | 10/1979 |
| DE | 3127303 A1 | 1/1983 |
| DE | 3037834 C2 | 5/1987 |
| DE | 3690196 C1 | 10/1989 |
| DE | 29822649 U1 | 4/1999 |
| DE | 102004053133 A1 | 5/2006 |
| DE | 202006017670 U1 | 7/2007 |
| DE | 102006020306 A1 | 11/2007 |
| DE | 102008033468 A1 | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102022107559 A1 | 10/2022 |
| DK | 1832675 T3 | 6/2013 |
| DK | 2772576 T3 | 5/2015 |
| DK | 3255192 T3 | 3/2020 |
| DK | 202370025 A1 | 2/2024 |
| DK | 202370426 A1 | 8/2024 |
| EP | 0240388 A2 | 10/1987 |
| EP | 0145603 B1 | 4/1988 |
| EP | 0370991 A2 | 5/1990 |
| EP | 0392568 A1 | 10/1990 |
| EP | 0805064 A2 | 11/1997 |
| EP | 0890430 A2 | 1/1999 |
| EP | 0926302 A2 | 6/1999 |
| EP | 0894885 B1 | 11/2002 |
| EP | 1586687 A1 | 10/2005 |
| EP | 1270787 B1 | 6/2010 |
| EP | 1858944 B1 | 7/2011 |
| EP | 2565304 A1 | 3/2013 |
| EP | 1832675 B1 | 4/2013 |
| EP | 1683446 B1 | 7/2013 |
| EP | 2774807 A2 | 9/2014 |
| EP | 2489770 B1 | 1/2015 |
| EP | 2772576 B1 | 4/2015 |
| EP | 2230132 B1 | 5/2016 |
| EP | 2653598 B1 | 7/2016 |
| EP | 3210487 A1 | 8/2017 |
| EP | 2792776 B1 | 10/2017 |
| EP | 2792775 B1 | 11/2017 |
| EP | 2848721 B1 | 1/2018 |
| EP | 3305500 A1 | 4/2018 |
| EP | 2751312 B1 | 7/2018 |
| EP | 3064627 B1 | 8/2018 |
| EP | 3064628 B1 | 8/2018 |
| EP | 2894246 B1 | 10/2018 |
| EP | 2966206 B1 | 11/2018 |
| EP | 3256632 B1 | 3/2019 |
| EP | 2532502 A1 | 5/2019 |
| EP | 3255192 B1 | 1/2020 |
| EP | 3779017 A1 | 2/2021 |
| EP | 3826820 A1 | 6/2021 |
| EP | 3889332 A1 | 10/2021 |
| EP | 3610760 B1 | 11/2021 |
| EP | 3974572 A1 | 3/2022 |
| ES | 2335962 A1 | 4/2010 |
| ES | 2335962 B1 | 4/2010 |
| ES | 2346180 T3 | 10/2010 |
| FR | 2432108 A1 | 2/1980 |
| FR | 2596626 A1 | 10/1987 |
| FR | 2675440 B1 | 12/1993 |
| FR | 2850260 A1 | 7/2004 |
| FR | 3050409 A1 | 10/2017 |
| FR | 3050409 B1 | 10/2017 |
| FR | 3063461 B1 | 3/2019 |
| FR | 3109753 B1 | 11/2021 |
| GB | 721866 | 1/1955 |
| GB | 721866 A | 1/1955 |
| GB | 1009799 A | 11/1965 |
| GB | 2275695 A | 9/1994 |
| GB | 2576141 A | 2/2020 |
| GB | 2577591 B | 4/2021 |
| GB | 2589497 B | 11/2021 |
| GB | 2628886 A | 10/2024 |
| IN | 201717042989 A | 3/2018 |
| IN | 336480 B | 5/2020 |
| IN | 202047045846 A | 10/2020 |
| IN | 351780 B | 11/2020 |
| IN | 382056 B | 11/2021 |
| IN | 202117027707 A | 11/2021 |
| JP | S556515 A | 1/1980 |
| JP | S5517527 A | 2/1980 |
| JP | H04286627 A | 10/1992 |
| JP | H0861414 A | 3/1996 |

(56) References Cited

FOREIGN PATENT DOCUMENTS

| | | |
|---|---|---|
| JP | H1046185 A | 2/1998 |
| JP | H115282 A | 1/1999 |
| JP | H11350326 A | 12/1999 |
| JP | 2000004993 A | 1/2000 |
| JP | 2001046185 A | 2/2001 |
| JP | 2001055719 A | 2/2001 |
| JP | 2001061612 A | 3/2001 |
| JP | 2001070106 A | 3/2001 |
| JP | 2001310378 A | 11/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003250667 A | 9/2003 |
| JP | 2003251089 A | 9/2003 |
| JP | 2003268668 A | 9/2003 |
| JP | 2004202858 A | 7/2004 |
| JP | 3686690 B2 | 8/2005 |
| JP | 3686692 B2 | 8/2005 |
| JP | 2006006924 A | 1/2006 |
| JP | 2006200117 A | 8/2006 |
| JP | 2006200119 A | 8/2006 |
| JP | 2006200120 A | 8/2006 |
| JP | 2007098013 A | 4/2007 |
| JP | 4181878 B2 | 11/2008 |
| JP | 2009090089 A | 4/2009 |
| JP | 4350285 B2 | 10/2009 |
| JP | 4350286 B2 | 10/2009 |
| JP | 4350287 B2 | 10/2009 |
| JP | 2012115515 A | 12/2010 |
| JP | 2011045424 A | 3/2011 |
| JP | 2011152779 A | 8/2011 |
| JP | 2011177413 A | 9/2011 |
| JP | 2013091862 A | 10/2011 |
| JP | 4835150 B2 | 12/2011 |
| JP | 4907991 B2 | 4/2012 |
| JP | 5165809 B1 | 3/2013 |
| JP | 5339107 B1 | 11/2013 |
| JP | 5418741 B1 | 2/2014 |
| JP | 5454733 B1 | 3/2014 |
| JP | 5454734 B1 | 3/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2015205611 A | 11/2015 |
| JP | 5868964 B2 | 2/2016 |
| JP | 2016028900 A | 3/2016 |
| JP | 2016036972 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 2016189879 A | 11/2016 |
| JP | 6182249 B2 | 8/2017 |
| JP | 2017150100 A | 8/2017 |
| JP | 6228278 B2 | 11/2017 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A | 12/2019 |
| JP | 6661666 B2 | 3/2020 |
| JP | 2020045589 A | 3/2020 |
| JP | 2020090648 A | 6/2020 |
| JP | 6725823 B2 | 7/2020 |
| JP | 2020127523 A | 8/2020 |
| JP | 2020156629 A | 10/2020 |
| JP | 6786500 B2 | 11/2020 |
| JP | 2020192164 A | 12/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 101141773 B1 | 5/2012 |
| KR | 101250622 B1 | 4/2013 |
| KR | 20130067823 A | 6/2013 |
| KR | 20170017488 A | 2/2017 |
| KR | 101717488 B1 | 3/2017 |
| KR | 101722929 B1 | 4/2017 |
| KR | 101722932 B1 | 4/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| NL | 1032699 C2 | 4/2008 |
| WO | 1992018224 A1 | 10/1992 |
| WO | 1995015768 A1 | 6/1995 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A1 | 2/2004 |
| WO | 2004063450 A1 | 7/2004 |
| WO | 2005030011 A1 | 4/2005 |
| WO | 2006068120 A1 | 6/2006 |
| WO | 2009092153 A1 | 7/2009 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |
| WO | 2017199474 A1 | 11/2017 |
| WO | 2018068451 A1 | 4/2018 |
| WO | 2019036559 A1 | 2/2019 |
| WO | 2019188090 A1 | 10/2019 |
| WO | 2019230304 A1 | 12/2019 |
| WO | 2020021263 A1 | 1/2020 |
| WO | 2020090648 A1 | 5/2020 |
| WO | 2020111110 A1 | 6/2020 |
| WO | 2020116327 A1 | 6/2020 |
| WO | 2020245670 A1 | 12/2020 |
| WO | 2021074601 A1 | 4/2021 |
| WO | 2021122937 A1 | 6/2021 |
| WO | 2021141601 A1 | 7/2021 |
| WO | 2022097435 A1 | 5/2022 |

(56) References Cited

FOREIGN PATENT DOCUMENTS

| WO | 2023101995 A2 | 6/2023 |
|---|---|---|
| WO | 2023122018 A2 | 6/2023 |
| WO | 2023172483 A1 | 9/2023 |
| WO | 2023204905 A1 | 10/2023 |
| WO | 2023220261 A1 | 11/2023 |
| WO | 2023244721 A1 | 12/2023 |
| WO | 2023250026 A1 | 12/2023 |
| WO | 2024006134 A1 | 1/2024 |
| WO | 2024006143 A1 | 1/2024 |
| WO | 2024097012 A1 | 5/2024 |
| WO | 2024136943 A1 | 6/2024 |

OTHER PUBLICATIONS https://www.toyobo-global.com/seihin/breathair_youto_htm, Toyobo Breathair, Cushion Materials, 1996-2013, 3 pages.
https://www.youtube.com/watch2v=eFiPBu fBe4, The Making of a Newton Wovenaire Crib Mattress, Apr. 21, 2016, 3 pages.
http://airstring.com, Introducing Airstring The Future of Cushioning, 2016, 13 pages.
Airstring.com, About Airstring, Jan. 18, 2021, 13 pages.
www.newtonbaby.com/pages/design, Born in water, designed to breathe, Jan. 28, 2021, 11 pages.
https://www.toyobo-global.com/seihin/breathair/breathair_youto.htm, Applications, Sep. 10, 2019, 5 pages.
https://www.youtube.com/watch?v=eFiPBu_fBe4, The Making of a Newton Wovenaire Crib Mattress—YouTube, 3 pages, Apr. 21, 2016.
https://www.youtube.com/watch?v=eFiPBu_fBe4, The Making of a Newton Wovenaire Crib Mattress, Apr. 21, 2016, 3 pages.

VEHICLE SEATING SYSTEM AND METHOD FOR PRODUCING SAME

CROSS-REFERENCE TO RELATED APPLICATION

This application is a Continuation of U.S. patent application Ser. No. 17/540,547, filed on Dec. 2, 2021, which is hereby incorporated in its entirety by reference herein.

TECHNICAL FIELD

The present disclosure relates to a vehicle seating system and a method for producing a vehicle seating system.

BACKGROUND

Vehicle seating systems may be relatively simple structures—e.g., an assembly of a frame, one or more cushions, and a cover material. Conversely, they can be extremely complex systems that include electromechanical or pneumatic back support, occupancy sensors, seatbelt sensors, and myriad different types of sophisticated ventilation systems, just to name a few of the possible features. One component that is common to most of these seating systems is a cushion, and in many cases a number of different cushions to provide support and comfort to a seated occupant. Many of these cushions are made from a foam material, such as injection-molded polyethylene. Injection-molded polymeric foams can be configured to accommodate seating systems with different properties. For example, the density of the foam may be engineered to provide a desired amount of support for a seated occupant, and to accommodate various ancillary systems, such as a ventilation system.

One limitation of this configuration is that the weight of the seat cushion may increase significantly when the density of the foam is increased. To address this limitation, alternative materials are being increasingly used for vehicle-seat cushions. For example, a stranded-mesh material may be used to form at least part of the seat cushion, and depending on the material used and how the strands are integrated to form the mesh, a relatively low density stranded-mesh material may provide the same or similar support as a much higher density injection-molded foam material. One limitation of using a stranded-mesh material for a seat cushion is the difficulty in attaching a trim cover to this material. To avoid sagging and bagginess, trim covers are usually secured in several places inside the seat cushion. And unlike a relatively dense injection-molded foam, it may be difficult to integrate trim-cover fasteners into a stranded-mesh material. Therefore, a need exists for a system and method for overcoming the limitations of a stranded-mesh seat cushion.

SUMMARY

Embodiments described herein may include a vehicle seating system having a cushion made at least in part from a stranded-mesh material and configured to support a seated occupant. The seating system may also include a support structure configured to support the cushion, and a trim-cover material configured to be disposed over at least a portion of the stranded-mesh material. The stranded-mesh material may include an integrated attachment arrangement configured to receive a fastening arrangement for securing the trim-cover material to the stranded-mesh material.

Embodiments described herein may include a vehicle seating system that includes a stranded-mesh material forming a cushion configured to support a seated occupant and including an integrated attachment arrangement. The vehicle seating system may also include a support structure configured to support the cushion, and a trim-cover material configured to be disposed over at least a portion of the cushion. The integrated attachment arrangement may be configured to receive a fastening arrangement for securing the trim-cover material to the stranded-mesh material.

Embodiments described herein may include a method for producing a vehicle seating system that includes providing a cushion configured to support a seated occupant. The cushion may be formed at least in part from a stranded-mesh material having a plurality of integrated polymeric strands. The method may also include integrating an attachment arrangement in the stranded-mesh material, where the integrated attachment arrangement is configured to receive a fastening arrangement for securing a trim-cover material to the stranded-mesh material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
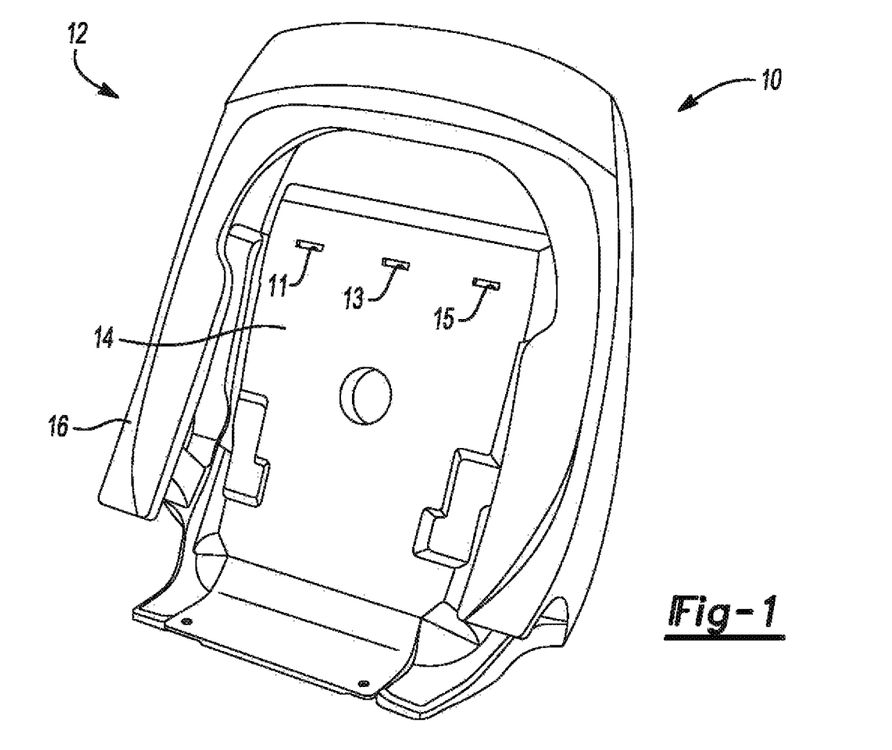
FIG. 1 shows a portion of the vehicle seating system in accordance with embodiments described herein.
Figure 4A:
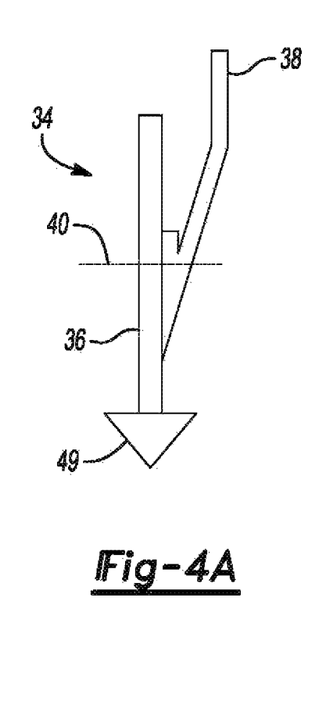
FIGS. 4A-4C show various fastening arrangements for securing a trim cover to a stranded-mesh material in accordance with embodiments described herein.
Figure 4B:
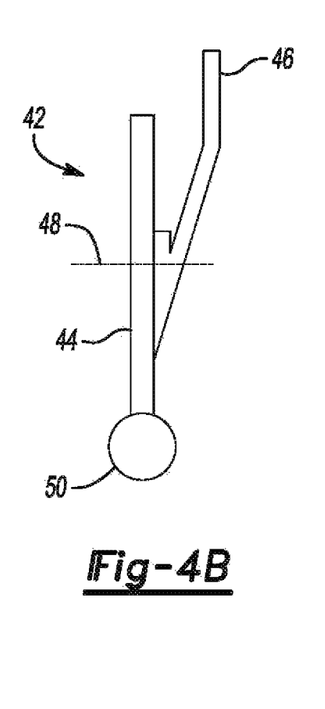
Figure 4C:
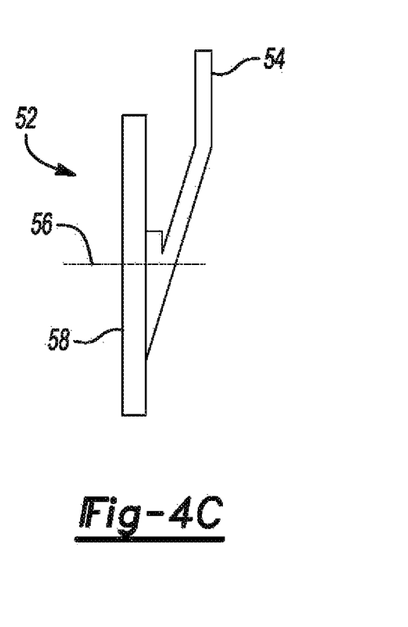
Figure 5:
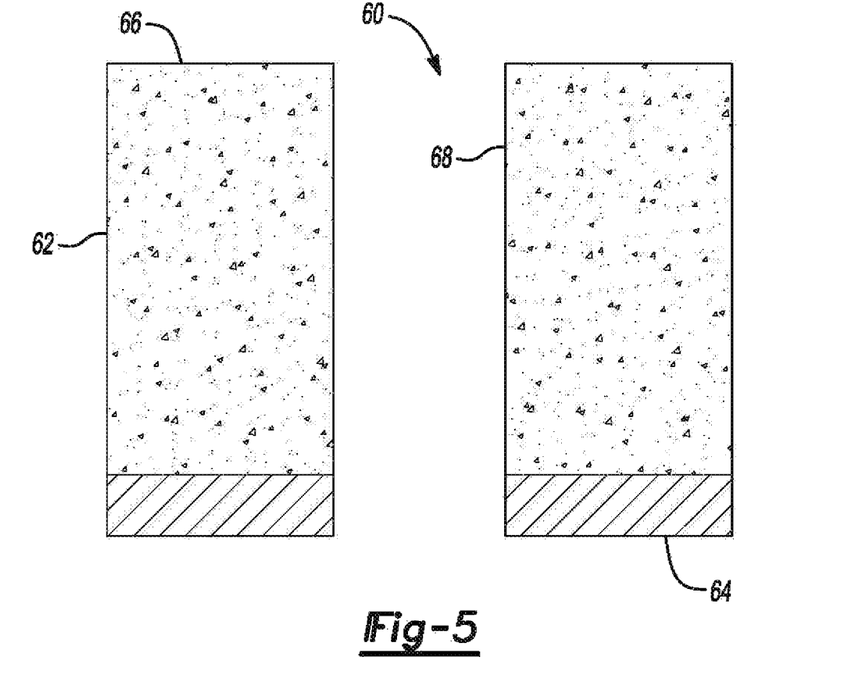
FIG. 5 shows an integrated attachment arrangement as part of a seating system in accordance with embodiments described herein.

FIG. 1 shows a portion of a vehicle seating system 10 in accordance with embodiments described herein. More specifically, FIG. 1 shows a seat back 12 that includes a cushion 14 and a support structure, such as a seat frame 16, configured to support the cushion 14. Although the embodiment shown in FIG. 1 is illustrated and described in terms of a vehicle seat back, it is understood that embodiments described herein may also apply to a seat bottom. In the embodiment shown in FIG. 1, the cushion 14 is made from a stranded-mesh material 18, which is shown in more detail in FIG. 2. As shown in FIG. 1, there are several openings 11, 13, 15 in the cushion 14. The openings 11, 13, 15 provide access to attachment features positioned within the stranded-mesh material 18, which, as explained in more detail below in conjunction with FIGS. 3-5, provide points of attachment for a trim-cover material.

Figure 2:
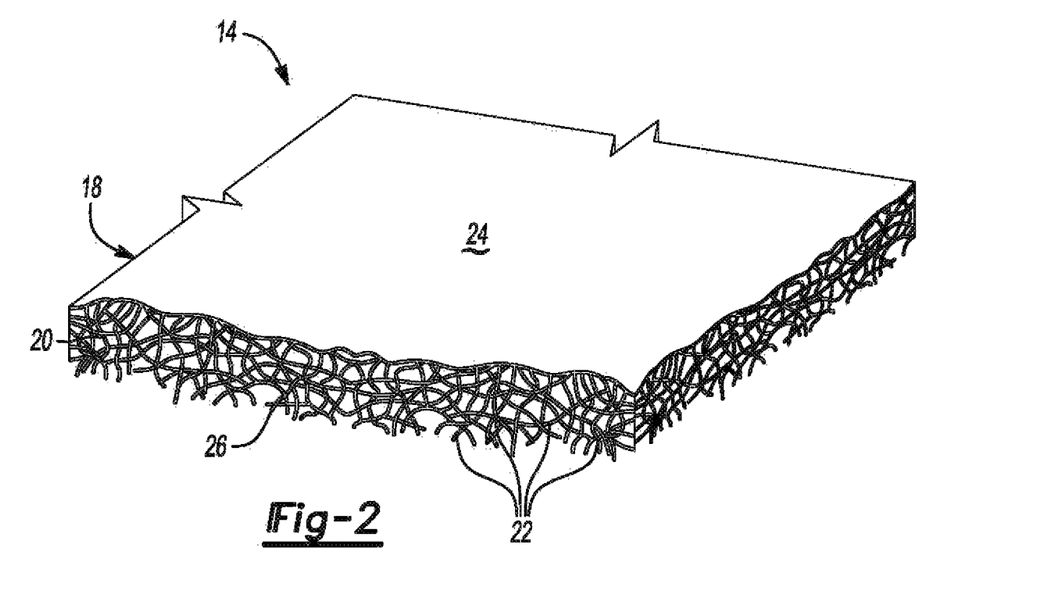
FIG. 2 shows a stranded-mesh material that may be used with the seating system shown in FIG. 1.

In the embodiment shown in FIG. 2, the stranded-mesh material 18 is made from a polymeric mesh 20 having a plurality of integrated polymeric strands 22—for clarity, only some of the strands 22 are labeled. The stranded-mesh material 18 includes a first surface 24 and a second surface 26 positioned opposite to the first surface 24. As shown in FIG. 2, the first surface 24 is substantially closed, while the second surface 26 is substantially open. The substantially closed surface 24 may include small or even microscopic pores, but the majority of the surface 24 is closed and would need to be penetrated to access the polymeric mesh 20 below. One method for producing a closed surface on a polymeric mesh such as shown in FIG. 2 is to apply heat and force until at least some of the strands 22 melt into each other to form the surface 24.

In the embodiment shown in FIG. 2, a force of about 20 pounds and a temperature of about 450° F. is sufficient to create the substantially closed surface 24. Different amounts of force and heat may be used for stranded-mesh materials made from different polymers or other materials, or for different densities and configurations of the integrated strands, such as the strands 22. The stranded-mesh material 18 may be made from, for example, a linear low density polyethylene material, although other polymers and materials effective to provide the desired properties and functionality are contemplated. As described in more detail below, the substantially closed surface 24 may form a substrate for the stranded-mesh material 18, which may be used for a number of things, including inhibiting liquid and gas penetration—including, for example, to make the surface airtight—and to facilitate attachment of a trim-cover material. Although the embodiment shown in FIG. 2 includes a substantially closed surface and a substantially open surface, other embodiments may have any number of substantially closed or substantially open surfaces, exclusively or in combination—including not just the top and bottom surfaces as shown in FIG. 2, but also on one or more of the edge surfaces.

Figure 3:
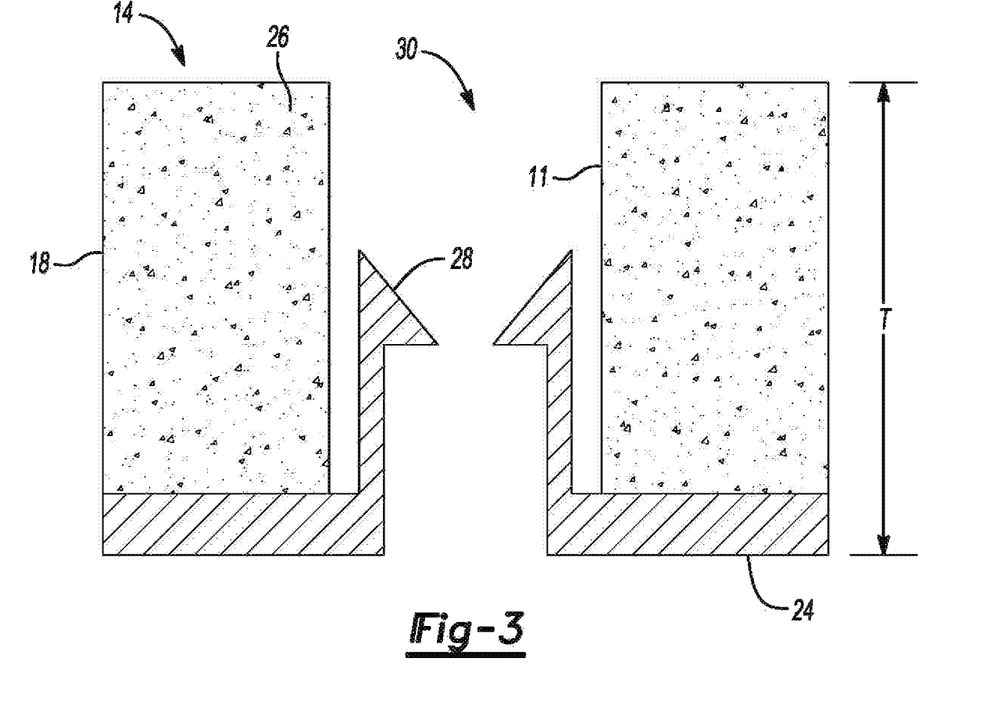
FIG. 3 shows a cross-sectional view of an integrated attachment arrangement as part of a seating system in accordance with embodiments described herein.

FIG. 3 shows a cross-sectional view of a portion of the cushion 14, and in particular, a cross section of the stranded-mesh material 18 shown in FIG. 2. The first and second surfaces 24, 26 are reversed from the orientation shown in FIG. 2. In practice, the first surface 24, which as described above forms a type of substrate, may provide support for an attachment feature such as a trim clip 28 illustrated in FIG. 3. The trim clip 28 may be bonded to the substrate 24 with heat and force, or by an adhesive. Alternatively, a trim clip may be attached to a stranded-mesh material by any other means effective to create a secure attachment. The trim clip 28 may be part of an integrated attachment arrangement 30 that also includes the aperture 11 in which the trim clip 28 is positioned. Although the aperture 11 is shown in FIG. 3 as an example, the other apertures 13, 15—see FIG. 1—may also include trim clips or other attachment features for securing a trim-cover material.

As shown in FIG. 3, the second surface 26 of the stranded-mesh material 18 is the A-surface—i.e., it is configured to receive a trim-cover material over it. Conversely, the substrate 24 is configured as the B-surface positioned downward when used on a seat bottom and toward the back when used on a seat back. In the embodiment shown in FIG. 3, the aperture 32 is disposed through a thickness (T) of the stranded-mesh material 18, including through the first and second surfaces 24, 26. As shown in FIG. 3, the thickness (T) is bounded by the first surface 24 and the second surface 26. As described above, the trim clip 28 is attached to the second surface 24 of the stranded-mesh material 18, and as shown in FIG. 3, it extends into the aperture 32, but is positioned below the second surface 26.

As described above, embodiments described herein may include a fastening arrangement for securing a trim-cover material to the stranded-mesh material 18. FIGS. 4A-4C show several types of fastening arrangements that may be used. More specifically, FIG. 4A shows a fastening arrangement 34 that includes an arrow-type tie-down 36, which may be sewn to a trim-cover material 38 along a sewing seam 40. The arrow-type tie-down 36 may readily attach to the trim clip 28 shown in FIG. 3. Similarly, a fastening arrangement 42 includes a tie-down 44, shown in FIG. 4B; it is also sewn to a trim-cover material 46 along a sewing seam 48. Rather than having an arrowhead at its end, the tie-down 44 includes a round bead 50 that may also conveniently attached to a trim clip, such as the trim clip 28 shown in FIG. 3. The fastening arrangements 34, 42 may be used with other types of trim clips or attachment features, such as a T-shaped attachment feature that allows the arrowhead 49 or the round head 50 to be secured to it. Finally, FIG. 4C shows another type of fastening arrangement 52, which is also attached to a trim-cover material 54 along a sewing seam 56.

As shown in FIG. 4C, the fastening arrangement 52 includes a fastener 58 that has neither an arrowhead nor a round head such as the tie-downs 36, 44. Rather, this type of fastening arrangement may be referred to as a "loose T" and may be effective for attaching the trim-cover material 54 to an attachment arrangement 60 integrated into a stranded-mesh material 62 such as shown in FIG. 5. As shown in FIG. 5, the stranded-mesh material 62 includes a substantially closed surface 64 and a substantially open surface 66 positioned opposite the surface 64. The attachment arrangement 60 in this embodiment includes only an aperture 68 positioned through a thickness of the stranded-mesh material 62, including through the surfaces 64, 66. As described above, the fastening arrangement 52 shown in FIG. 4C may be used to secure the trim-cover material 54 to the stranded-mesh material 62. In particular, ends of the fastener 58 may be inserted into spaces in the stranded-mesh material 52, which keeps the trim-cover material 54 secured.

Although the embodiments described above are largely directed to a vehicle seating system, embodiments also contemplate a method for producing such a vehicle seating system. In at least some embodiments, the method may include providing a cushion formed at least in part from a stranded-mesh material, such as the material 18 illustrated and described above. The method may also include integrating an attachment arrangement, such as the attachment arrangements 30, 60 illustrated in FIG. 3 and FIG. 5, respectively. Embodiments of the method may also include forming a substantially closed surface on the stranded-mesh material by melting at least some of the integrated polymeric strands—see, e.g., the surface 24 in FIG. 3. An aperture may be formed through a thickness of the stranded-mesh material, such as the aperture 32 shown in FIG. 3. As described above, the aperture 32 is configured to receive a fastening arrangement, such as the trim clip 28. Finally, embodiments of the method may include positioning a trim clip in the aperture and then attaching the trim clip to the substantially closed surface, such as illustrated in FIG. 3 and described above.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system, comprising:
   a cushion made at least in part from a stranded-mesh material having a first surface and a second surface that is opposite to the first surface; and
   a trim-cover configured to be disposed over at least a portion of the stranded-mesh material, wherein the stranded-mesh material comprises an integrated attachment arrangement comprising an aperture disposed through a thickness of the stranded-mesh material, and wherein the aperture is configured to receive a fastening arrangement for securing the trim-cover to the stranded-mesh material.

2. The system of claim 1, wherein the stranded-mesh material is made at least in part from a polymeric mesh having a plurality of integrated polymeric strands.

3. The system of claim 2, wherein at least one of the first surface or the second surface is a substantially closed surface that is formed from at least some of the integrated polymeric strands, and wherein the other of the first surface or the second surface is a substantially open surface.

4. The system of claim 1, wherein the aperture is disposed through the thickness of the stranded-mesh material and through the first surface and the second surface.

5. The system of claim 1, wherein the integrated attachment arrangement further comprises a trim clip attached to one of the first surface or the second surface, and wherein the trim clip, is positioned into the aperture, projecting into the thickness of the stranded-mesh material.

6. The system of claim 5, wherein the trim clip is positioned below the other one of the first surface or the second surface.

7. The system of claim 1, wherein the fastening arrangement includes a tie-down sewn to the trim-cover.

8. A seating system, comprising:
   a trim-portion; and
   a cushion comprising a first surface and a second surface opposite to the first surface, wherein the cushion is defined by a stranded-mesh material that includes an integrated attachment, and wherein the integrated attachment comprises an aperture configured to receive a fastening arrangement for securing the trim-portion to the stranded-mesh material.

9. The seating system of claim 8, wherein the stranded-mesh material includes a plurality of integrated polymeric strands, and wherein at least one of the first surface or the second surface is a substantially closed surface formed from at least some of the integrated polymeric strands.

10. The seating system of claim 9, wherein the other of the first surface or the second surface is a substantially open surface.

11. The seating system of claim 8, wherein the aperture is disposed through a thickness of the stranded-mesh material and through the first surface and the second surface.

12. The seating system of claim 8, wherein the integrated attachment further comprises a trim clip attached to one of the first surface or the second surface, and wherein the trim clip, is positioned into the aperture, projecting into the thickness of the stranded-mesh material.

13. The seating system of claim 12, wherein the trim clip is positioned below the other one of the first surface or the second surface.

14. The seating system of claim 8, wherein the fastening arrangement includes a tie-down sewn to the trim-portion.

15. A method, comprising:
   forming a cushion configured to support an occupant, wherein the cushion is formed at least in part from a stranded-mesh material; and
   integrating an attachment arrangement in the stranded-mesh material, wherein the integrated attachment arrangement comprising an aperture disposed through a thickness of the stranded-mesh material, and wherein the aperture is configured to receive a fastening arrangement for securing a trim-cover to the stranded-mesh material.

16. The method of claim 15, further comprising:
   forming the cushion from the stranded-mesh material comprising a plurality of integrated polymeric strands; and
   forming a substantially closed surface on the stranded-mesh material by applying heat and force until at least some of the integrated polymeric strands melt into each other to form the substantially closed surface.

17. The method of claim 15, wherein the cushion comprises a first side and a second side that is opposite to the first side, and wherein the thickness is bounded by the first surface and the second surface.

18. The method of claim 17, further comprising positioning a trim clip in the aperture, and attaching the trim clip to one of the first surface or the second surface.

19. The system of claim 5, wherein the trim clip is bonded with one of the first surface or the second surface by one of applying heat and force or applying an adhesive.

20. The system of claim 7, wherein the tie-down is one of an arrow-type, a round bead type, or a loose T type.

* * * * *